United States Patent [19]

Stärker et al.

[11] Patent Number: 5,662,007

[45] Date of Patent: Sep. 2, 1997

[54] MOTOR VEHICLE GEARBOX CONTROL SYSTEM IN AN OIL-FILLED CASING

[75] Inventors: Klaus Stärker, Neutraubling; August Kammerl, Brunn, both of Germany

[73] Assignee: Siemens Aktiengesellschaft, Munich, Germany

[21] Appl. No.: 557,414

[22] Filed: Nov. 13, 1995

Related U.S. Application Data

[63] Continuation of PCT/DE94/00533 May 9, 1994 published as WO94/27067 Nov. 24, 1994.

[51] Int. Cl.$^6$ .................................................. F16H 57/04
[52] U.S. Cl. ............................... 74/606 A; 74/606 R
[58] Field of Search ....................... 74/606 A, 606 R

[56] References Cited

U.S. PATENT DOCUMENTS 4,271,728  6/1981  Wakamatsu .
5,361,650  11/1994  Klecker et al. ................ 74/606 R

FOREIGN PATENT DOCUMENTS 0 513 424  11/1992  Germany .
1-312252  12/1989  Japan ........................ 74/606 R Primary Examiner—Charles A. Marmor
Assistant Examiner—Mary Ann Battista
Attorney, Agent, or Firm—Herbert L. Lerner; Laurence A. Greenberg

[57] ABSTRACT

A control system includes a casing being partially filled with oil and in which an electrical, mechanical and/or hydraulic control device is disposed. An electronic control system is functionally associated with the control device. In order to keep electrical lines from the electronic control system to the control device as short as possible, the electronic control system is located inside the casing and is partially surrounded by oil. A printed circuit board and components of the electronic control system are sealed with a protective layer.

7 Claims, 1 Drawing Sheet

5,662,007

MOTOR VEHICLE GEARBOX CONTROL SYSTEM IN AN OIL-FILLED CASING

CROSS-REFERENCE TO RELATED APPLICATION

This application is a Continuation of International Application Ser. No. PCT/DE94/00533, filed May 9, 1994.

BACKGROUND OF THE INVENTION

Field of the Invention

The invention relates to a gearbox control system for a motor vehicle, having a casing being partially filled with oil and in which an electrical, mechanical and/or hydraulic control device is disposed, and a functionally associated electronic control system being disposed inside the casing, being at least partially surrounded by oil and being electrically connected to the control device through lines.

A control unit for automatic motor vehicle gearboxes which is known from Published European Patent Application 0 513 424 A1, corresponding to U.S. Pat. No. 5,396,420, is disposed outside the gearbox casing in the motor vehicle. Signals are transmitted from the control unit to the gearbox through lines. A control device, such as actuators or final controlling elements in the gearbox, is controlled with the signals.

In such a control system, which has the control unit and associated control device, additional space is required for the control unit. Since the control unit is disposed outside the gearbox casing, extremely long lines to the control device are required.

A further control unit which is known from U.S. Pat. No. 4,271,728 is disposed in an oil sump of a gearbox control unit. The control unit is connected to the gearbox through electrical lines. There is no mention of the structure of the lines and possible mechanical stresses.

SUMMARY OF THE INVENTION

It is accordingly an object of the invention to provide a gearbox control system for a motor vehicle, which overcomes the hereinafore-mentioned disadvantages of the heretofore-known devices of this general type, which does not require any additional space for a control unit and which is kept vibration-proof without a large degree of outlay.

With the foregoing and other objects in view there is provided, in accordance with the invention, a gearbox control system for a motor vehicle, comprising a casing; oil partially filling the casing; an electrical, mechanical and/or hydraulic control device disposed in the casing; a functionally associated electronic control system being disposed inside the casing, being at least partially surrounded by the oil and having electrical terminals; and lines being constructed as rigid wires attached to the electrical terminals of the electronic control system and to the control device for electrically connecting the electronic control system to the control device.

An electronic control system for controlling a gearbox, for example, is disposed inside the gearbox casing or housing. The space which is present in the gearbox casing is thus utilized. The electrical connections between the electronic control system and the control device are constructed as a rigid wire mesh. An advantage of this configuration is that the lines to the control device are very short and there is a saving in terms of lines. Therefore, only a small number of plug parts is required.

In accordance with another feature of the invention, there is provided a printed circuit board and a plug connector, the plug connector and the lines connecting the printed circuit board to the control device.

In accordance with a further feature of the invention, the electronic control system has components, and there is provided a protective layer surrounding the printed circuit board and the components.

In accordance with an added feature of the invention, the electronic control system has power components with cooling vanes, and the cooling vanes are not surrounded by the protective layer.

In accordance with an additional feature of the invention, the components are attached to the printed circuit board at a distance from the printed circuit board permitting the components to be washed around by the oil.

In accordance with a concomitant feature of the invention, there is provided a metal casing in which the electronic control system is fitted, the metal casing being disposed in the casing, and the metal casing being partially surrounded by the oil.

The electronic control system can be partially surrounded by oil. This has the advantage of permitting the oil to be used to cool the components. The electronic control system is protected from the oil by a protective layer. However, it is advantageous if cooling vanes of power components are not surrounded by the protective layer so that the heat generated by them can be dissipated better to the oil.

In addition, all of the components can be attached to the electronic control system at a distance from the printed circuit board of the electronic control system. Thus, the oil can flow around the components and absorb their heat well. Moreover, the control unit and the control device can be connected to one another inside the casing using rigid, electrically conductive wires.

Other features which are considered as characteristic for the invention are set forth in the appended claims.

Although the invention is illustrated and described herein as embodied in a gearbox control system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
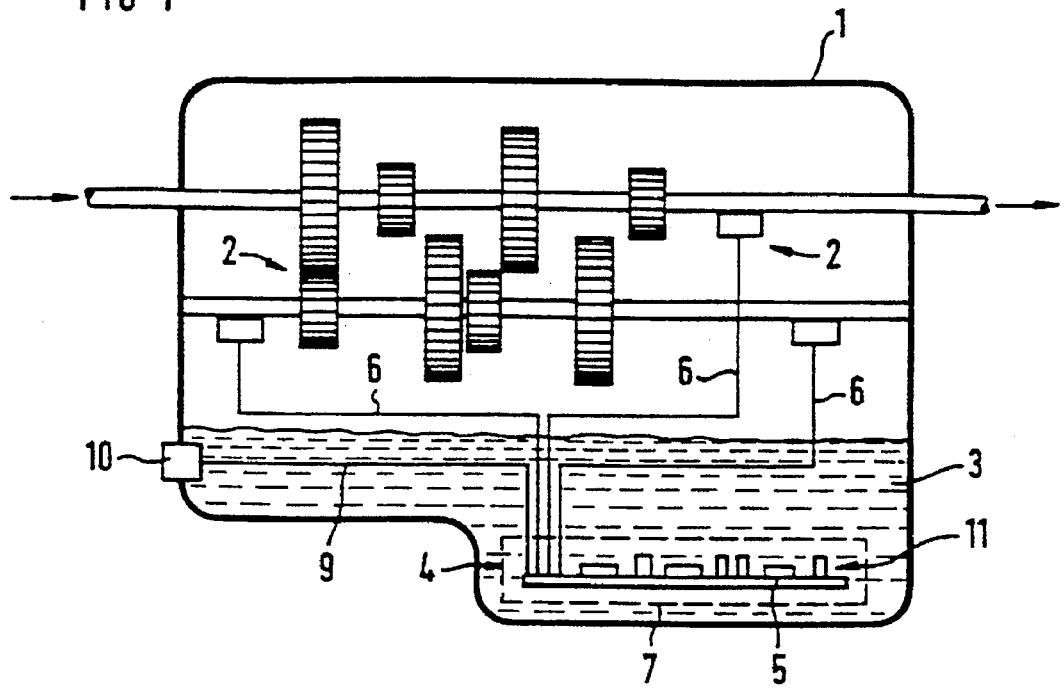
FIG. 1 is a fragmentary, diagrammatic, longitudinal-sectional view of control system according to the invention.

Referring now to the figures of the drawing in detail and first, particularly, to FIG. 1 thereof, there is seen a gearbox control system according to the invention which has a gearbox casing 1 with an electrical, mechanical and/or hydraulic control device 2 and a functionally associated electronic control system. The control device 2 is an automatic gearbox with its shafts, gearwheels, clutches, brakes, etc. and a functionally associated hydraulic control with an oil pump, throttle valves, regulators, sensors and hydraulic valves for shifting gears of the gearbox (which is only shown in passing in highly simplified form in FIG. 1), with the gears being detected by the electronic control system.

The gearbox casing 1 is partially filled with transmission oil 3 with which mechanical parts are lubricated or hydraulic valves are switched. The oil 3 is located in the gearbox casing 1 and is fed from there, through the use of the oil pump, to parts and valves to be lubricated.

The gearbox is controlled by the functionally associated electronic control system, which is referred to below as a control unit 4. The control unit 4 has an electronic circuit which is disposed on one or more printed circuit boards 5. The circuit is connected to the control device 2 through rigid, electrically conductive lines 6.

The control unit 4 is disposed inside the gearbox casing 1. It is advantageously located in the vicinity of the control device 2. Thus, the electrical connection paths to the control device 2 are very short. If the gearbox casing 1 provides sufficient space, the control unit 4 can be surrounded by an additional metal casing 7, which is indicated by broken lines in FIG. 1. Otherwise the control unit 4 is disposed virtually "exposed" in the gearbox casing 1, i.e. the printed circuit boards 5 with the control circuit are freely located in the interior of the casing.

The control unit 4 can be welded, bonded, bolted or riveted, fitted into a recess or locked into locking elements on a wall of the gearbox casing 1. The way in which it is attached is unimportant in this case. All that is important is that it is disposed in the gearbox casing 1. For this purpose, an unused part of the interior of the gearbox casing 1 is utilized for the control unit 4. Therefore, space is utilized which is present anyway. The control unit 4 may therefore be entirely or partially surrounded by transmission oil 3.

Apart from the lines 6 leading to the control device 2, the control unit 4 has further lines 9 leading to non-illustrated electrical devices outside the gearbox casing 1, for example to a battery, to a gearshift lever or to a gas pedal. These lines 9 can be passed through the wall of the gearbox casing 1 through a plug part 10 or directly, in a sealed manner. All of the lines 6 and 9 are connected to the control unit 4. The lines 6 and 9 can be soldered or welded onto the printed circuit board or else connected to the printed circuit board 5 through a non-illustrated plug connector, with the plug connector being attached to the printed circuit board 5.

It is convenient to manufacture the lines 6 and 9 within the gearbox casing 1 as rigid lines. For this purpose, electrically conductive wires are bent and disposed in the gearbox casing 1 in such a way that the control device 2 and the plug part 10 are electrically connected to the printed circuit board 5. At the same time, the wires must not touch one another but they may be surrounded by transmission oil 3 since the transmission oil 3 is electrically insulating.

The lines 6 and 9 can be simply inserted into the gearbox casing 1 with first ends of the lines 6 and 9 on the printed circuit board 5, for the purposes of mounting as a three-dimensional mesh with non-illustrated insulating spacing elements between the individual lines. When the control device 2 is mounted, its electrical terminals are positioned directly on second ends of the lines 6 and 9. Thus, the electrical connection is made between the printed circuit board 5 and the control device 2. As a result of this mesh, the lines 6 and 9 maintain their position even in the case of vibration stressing, for example during driving.

The control unit 4 is preferably disposed completely in the transmission oil 3. Since oil can absorb a large amount of heat and a maximum temperature of the oil is not exceeded as a result of the cooling of the gearbox, this ensures that components 11 of the circuit do not become overheated. The transmission oil 3 then acts as a heat sink for heat-generating components, which are discussed below as power components 12 with reference to FIG. 2.

Figure 2:
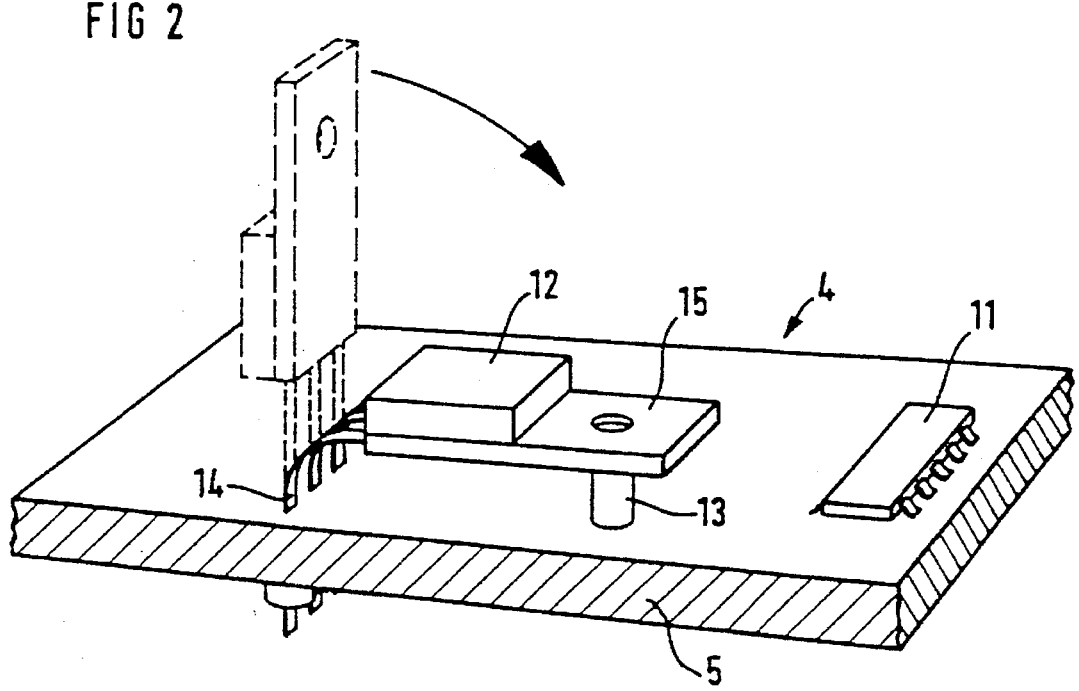
FIG. 2 is a fragmentary, perspective view of a printed circuit board with the electronic control system.

Since the heat of the power components 12 is dissipated to the outside, the power components 12 are attached to the printed circuit board 5 at a distance from it, as in FIG. 2. This can be done by using a spacing element 13 which is disposed between the power components 12 and the printed circuit board 5, during the mounting of the power components 12. The spacing element 13 can also be dispensed with if rigid connection legs 14 of the power components 12 are bent in such a way that the power components 12 are at a distance from the printed circuit board 5 after soldering. As a consequence of this, the transmission oil 3 can wash around the power components 12 to a satisfactory degree and absorb heat.

If the control unit 4 is disposed in the metal casing 7, cooling vanes 15 of the power component 12 or the power components 12 themselves can then be attached to a side wall of the metal casing 7. Thus, the heat generated by the power components 12 is dissipated to the metal casing 7. Since the metal casing 7 is washed around by transmission oil 3, the control unit 4 is thus cooled to a satisfactory degree and the circuit cannot fail because of overheating.

In order to ensure that the transmission oil 3 does not adversely affect the functioning of the components 11 of the circuit, the components 11 can be provided, together with the printed circuit board 5, with a non-illustrated protective layer, such as a layer of resist or of silicone, for example. If power components 12 are used in the circuit, it is to be ensured that the cooling vanes 15 of the power components 12 are not covered with the protective layer since the protective layer constitutes an increased heat resistance and thus badly dissipates the heat to the outside.

For this purpose, the power components 12 can be soldered into the printed circuit board in a standing position (as is illustrated in FIG. 2 by broken lines). After all of the components 11 are soldered or else bonded onto the printed circuit board 5, the printed circuit board 5 is immersed in a bath, in which the material for the protective layer, such as resist or silicone, for example, is located. The immersion is carried out to such an extent that the printed circuit board 5 with its components 11 is completely surrounded with the protective layer but the cooling vanes 15 of the power components 12 are not immersed. The components 11 can also be sealed with a protective layer, and can be soldered or bonded onto the printed circuit board 5, before the control unit 4 is mounted. Subsequently, the connection legs 14 of the power components 12 can be bent in such a way (as shown by the direction of the arrow in FIG. 2) that they are at a distance from the printed circuit board 5. If the gearbox casing 1 provides sufficient space, the power components 12 can also be mounted on the printed circuit board 5 in a standing position.

We claim:

1. A gearbox control system for a motor vehicle, comprising:

a casing;

oil partially filling said casing;

a control device disposed in said casing;

a functionally associated electronic control system being disposed inside said casing, being at least partially surrounded by said oil, and having components and electrical terminals;

lines being constructed as rigid wires attached to said electrical terminals of said electronic control system and to said control device for electrically connecting said electronic control system to said control device;

a printed circuit board and a plug connector, said plug connector and said lines connecting said printed circuit board to said control device;

a protective layer surrounding said printed circuit board and said components; and at least one of said components having cooling vanes which are not surrounded by said protective layer.

2. The gearbox control system according to claim 1, wherein said control device is an electrical control device.

3. The gearbox control system according to claim 1, wherein said control device is a mechanical control device.

4. The gearbox control system according to claim 1, wherein said control device is a hydraulic control device.

5. The gearbox control system according to claim 1, wherein said control device is an electrical, mechanical and hydraulic control device.

6. The gearbox control system according to claim 1, wherein said components are attached to said printed circuit board at a distance from said printed circuit board permitting said components to be washed around by said oil.

7. A gearbox control system for a motor vehicle, comprising:

a casing;

oil partially filling said casing;

a control device disposed in said casing;

a functionally associated electronic control system being disposed inside said casing, being at least partially surrounded by said oil and having electrical terminals;

lines being constructed as rigid wires attached to said electrical terminals of said electronic control system and to said control device for electrically connecting said electronic control system to said control device; and a metal casing in which said electronic control system is fitted, said metal casing being disposed in said casing, and said metal casing being partially surrounded by said oil.

* * * * *

UNITED STATES PATENT AND TRADEMARK OFFICE
CERTIFICATE OF CORRECTION

PATENT NO : 5,662,007
DATED : September 2, 1997
INVENTOR(S) : Klaus Staerker et al.

It is certified that error appears in the above-identified patent and that said Letters Patent is hereby corrected as shown below:

On title page,
Item [30] should read as follows:

May 12, 1993    [DE]    Germany ..... 93 07 228.7

Signed and Sealed this

Twenty-first Day of April, 1998

Attest:

BRUCE LEHMAN

*Attesting Officer*    *Commissioner of Patents and Trademarks*